(12) United States Patent
Sgouromitis et al.

(10) Patent No.: US 12,534,214 B1
(45) Date of Patent: Jan. 27, 2026

(54) AIRCRAFT ENGINE AUXILIARY OIL SYSTEM

(71) Applicant: PRATT & WHITNEY CANADA CORP., Longueuil (CA)

(72) Inventors: John Sgouromitis, Dorval (CA); Richard Brandt, Saint Lambert (CA); Mark Feeney, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/014,772

(22) Filed: Jan. 9, 2025

(51) Int. Cl.
*B64D 33/08* (2006.01)
*B64D 31/06* (2006.01)
*F02C 7/16* (2006.01)
*B64D 45/00* (2006.01)

(52) U.S. Cl.
CPC ............ *B64D 33/08* (2013.01); *B64D 31/06* (2013.01); *F02C 7/16* (2013.01); *B64D 2045/009* (2013.01); *F05D 2220/323* (2013.01); *F05D 2260/232* (2013.01); *F05D 2270/09* (2013.01)

(58) Field of Classification Search
CPC .... F02C 1/002; F02C 7/32; F02C 7/06; F02C 7/14; F02C 7/16; F02C 7/25; B64D 33/08; B64D 31/06; B64D 31/09; B64D 2045/009; B64D 2270/09
See application file for complete search history.

(56) References Cited

U.S. PATENT DOCUMENTS

| 4,030,296 | A | * | 6/1977 | Deinlein-Kalb | ........ F01D 25/34 60/656 |
| 4,309,870 | A | * | 1/1982 | Guest | ............... F01D 25/20 60/39.08 |
| 4,446,377 | A | * | 5/1984 | Kure-Jensen | ............ F02C 7/32 60/39.08 |
| 5,351,476 | A | | 10/1994 | Laborie et al. | |
| 6,886,324 | B1 | * | 5/2005 | Handshuh | ............... F01D 25/20 60/39.08 |
| 8,991,191 | B2 | | 3/2015 | Diaz et al. | |
| 10,513,949 | B2 | | 12/2019 | Parnin et al. | |
| 11,125,111 | B2 | | 9/2021 | Mason et al. | |
| 11,421,554 | B2 | | 8/2022 | Davies | |
| 11,702,990 | B2 | | 7/2023 | Smith | |

(Continued)

FOREIGN PATENT DOCUMENTS

| CH | 652453 A5 | 11/1985 | |
| CN | 112523870 A | * 3/2021 | .............. F02B 63/04 |

(Continued)

*Primary Examiner* — Craig Kim
(74) *Attorney, Agent, or Firm* — NORTON ROSE FULBRIGHT CANADA LLP (57) ABSTRACT

A method is provided for operating an aircraft engine in a fire-induced emergency shutdown state. An indication of a fire in a fire zone of the aircraft engine is received. In response to the receiving the indication of the fire in the fire zone of the aircraft engine, an emergency shutdown sequence of the aircraft engine is initiated. In response to the initiating the emergency shutdown sequence of the aircraft engine, an auxiliary oil pump positioned outside of the fire zone of the aircraft engine and distinct from a main oil pump of the aircraft engine is activated. Once activated, the auxiliary oil pump circulates oil through a main oil conduit of the aircraft engine.

17 Claims, 5 Drawing Sheets

(56) References Cited

U.S. PATENT DOCUMENTS

| | | | |
|---|---|---|---|
| 11,873,890 B2 * | 1/2024 | Gaully | F02C 7/14 |
| 12,281,614 B1 * | 4/2025 | Minelli | F02C 9/40 |
| 2006/0260323 A1 * | 11/2006 | Moulebhar | F02C 6/08 |
| | | | 60/793 |
| 2014/0069744 A1 | 3/2014 | Scipio et al. | |
| 2022/0349466 A1 * | 11/2022 | Gaully | F16H 57/0435 |
| 2023/0313739 A1 | 10/2023 | Becoulet et al. | |
| 2024/0336367 A1 * | 10/2024 | Apostin | B64D 27/30 |
| 2024/0401530 A1 * | 12/2024 | Oriol | F01D 7/00 |
| 2025/0164003 A1 * | 5/2025 | Sheridan | F16H 57/0435 |

FOREIGN PATENT DOCUMENTS

| | | | | |
|---|---|---|---|---|
| CN | 113811671 A | * | 12/2021 | F01D 21/12 |
| CN | 116529470 A | * | 8/2023 | F02C 7/14 |
| CN | 113811671 B | * | 6/2024 | F01D 21/12 |
| EP | 2025899 A2 | * | 2/2009 | B64D 41/00 |

\* cited by examiner

AIRCRAFT ENGINE AUXILIARY OIL SYSTEM

TECHNICAL FIELD

The disclosure relates generally to aircraft engines and, more particularly, to emergency shutdown procedures for aircraft engines.

BACKGROUND

Aircraft engines are provided with emergency shutdown procedures, for instance in the case of a fire inside the engine case. In some engines, the main engine rotor continues to be driven after fuel is cutoff during a fire-induced emergency shutdown procedure, for instance due to windmilling. The rotor may therefore continue to circulate oil through the various oil systems. However, in some engines, for instance turboprop and turboshaft engines, windmilling may be limited or not applicable. As such, the oil in the oil systems remains stagnant during a fire-induced emergency shutdown procedure and is thus not capable of dissipating heat. Improvements are thus desired.

SUMMARY

In one aspect, there is provided a method for operating an aircraft engine in a fire-induced emergency shutdown state, comprising: receiving an indication of a fire in a fire zone of the aircraft engine; in response to the receiving the indication of the fire in the fire zone of the aircraft engine, initiating an emergency shutdown sequence of the aircraft engine; and in response to the initiating the emergency shutdown sequence of the aircraft engine, activating an auxiliary oil pump positioned outside of the fire zone of the aircraft engine and distinct from a main oil pump of the aircraft engine, once activated, the auxiliary oil pump circulating oil through a main oil conduit of the aircraft engine.

In certain embodiments, the method as defined above includes one or more of the following features, in whole or in part, and in any combination.

In an embodiment, the step of activating the auxiliary oil pump is automatically initiated upon the initiating the emergency shutdown sequence of the aircraft engine.

In an embodiment, the method further includes powering the auxiliary oil pump with an auxiliary electrical power source positioned outside of the fire zone of the aircraft engine.

In an embodiment, the step of activating the auxiliary oil pump further includes bypassing the main oil pump by activating a bypass valve at a junction of the main oil conduit and an auxiliary oil conduit fluidly coupling the auxiliary oil pump to the oil main conduit upstream of the main oil pump.

In an embodiment, the method further includes powering the bypass valve via an auxiliary power source.

In an embodiment, the method further includes positioning the auxiliary oil pump within a nacelle surrounding the aircraft engine.

In another aspect, there is provided an oil system for an aircraft engine, comprising: a source of oil; a main oil pump operable for circulating oil from the source of oil to a plurality of components of the aircraft engine via a main oil conduit; and an auxiliary oil pump positioned outside of a fire zone of the aircraft engine, the auxiliary oil pump fluidly coupled to the main oil conduit to circulate oil through the main oil conduit to the components of the aircraft engine in the event of a fire-induced shutdown sequence of the aircraft engine.

In certain embodiments, the oil system as defined above includes one or more of the following features, in whole or in part, and in any combination.

In an embodiment, the oil system further includes an auxiliary power source configured to power the auxiliary oil pump in the event of the fire-induced shutdown sequence.

In an embodiment, the auxiliary power source includes a battery positioned outside of the fire zone.

In an embodiment, the oil system further includes a bypass valve at a junction between the oil conduit and an auxiliary oil conduit, the auxiliary oil conduit fluidly coupling the auxiliary oil pump to the oil conduit upstream of the main oil pump.

In an embodiment, the bypass valve is electrically controlled by an auxiliary power source.

In an embodiment, the auxiliary oil pump is positioned within a nacelle surrounding the aircraft engine.

In an embodiment, the auxiliary oil pump is positioned against a casing of the aircraft engine, remote from the fire zone.

In a further aspect, there is provided an aircraft engine system, comprising: an aircraft engine having a casing through which a core gas path flows, at least a portion of the core gas path defining a fire zone, and an oil system including a main oil pump and an oil conduit flowing oil throughout components of the aircraft engine; and an auxiliary oil pump disposed outside of the fire zone and in fluid communication with the oil conduit, the auxiliary oil pump independently powered from the main oil pump, the auxiliary oil pump adapted to circulate the oil through the oil conduit to cool the components of the aircraft engine in the case of a fire-induced shutdown sequence of the aircraft engine.

In certain embodiments, the aircraft engine system as defined above includes one or more of the following features, in whole or in part, and in any combination.

In an embodiment, the aircraft engine system further includes an auxiliary power source configured to power the auxiliary oil pump in the event of the fire-induced shutdown sequence.

In an embodiment, the auxiliary power source includes a battery positioned outside of the fire zone.

In an embodiment, the aircraft engine system further includes a bypass valve at a junction between the oil conduit and an auxiliary oil conduit, the auxiliary oil conduit fluidly coupling the auxiliary oil pump to the oil conduit upstream of the main oil pump.

In an embodiment, the bypass valve is electrically controlled by an auxiliary power source.

In an embodiment, the auxiliary oil pump is positioned within a nacelle surrounding the aircraft engine.

In an embodiment, the auxiliary oil pump is positioned against a casing of the aircraft engine, remote from the fire zone.

BRIEF DESCRIPTION OF THE DRAWINGS

Reference is now made to the accompanying figures in which.

DETAILED DESCRIPTION

Figure 1:
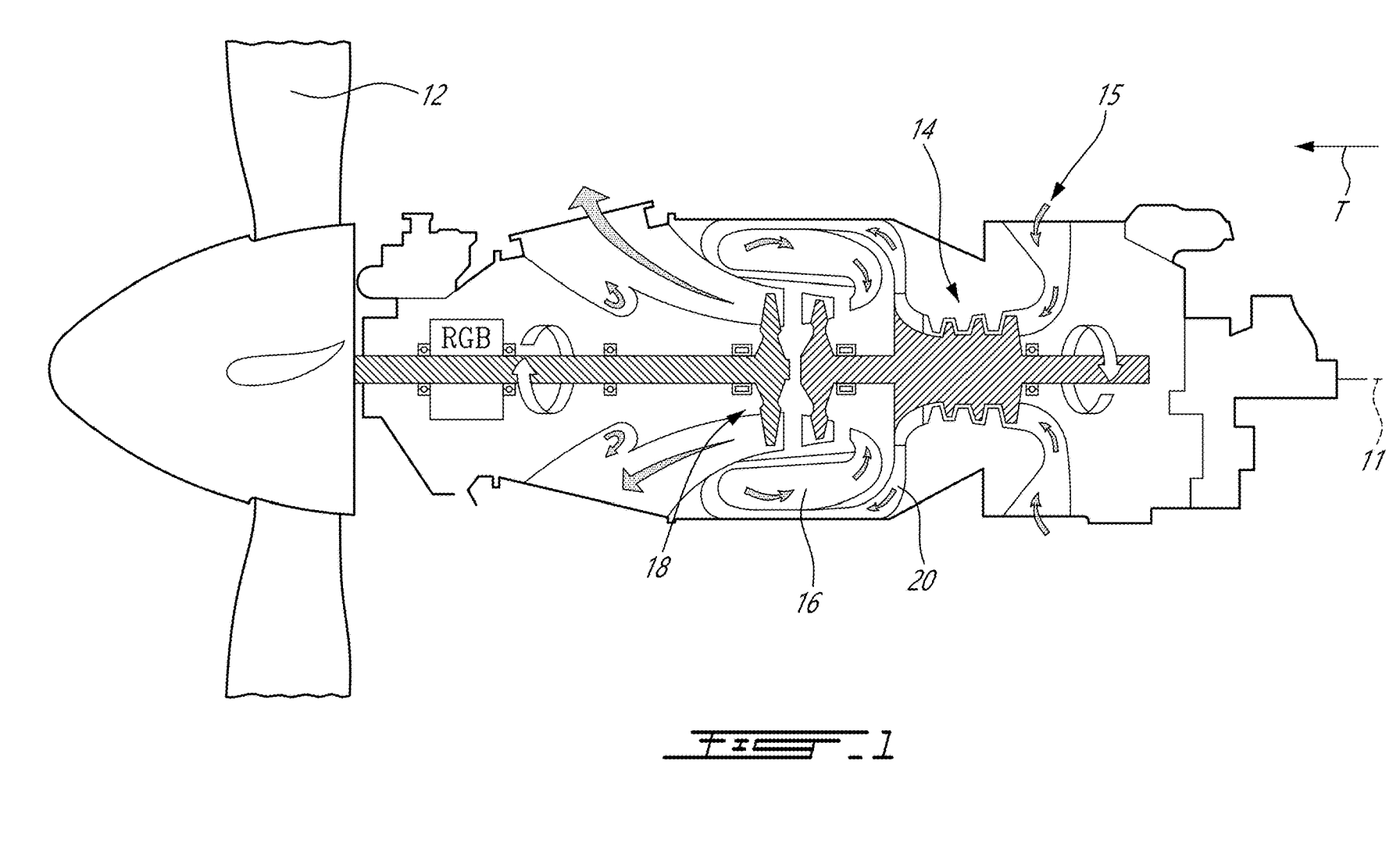
FIG. 1 is a schematic cross sectional view of a gas turbine engine.

FIG. 1 illustrates an aircraft engine depicted as a gas turbine engine 10 (in this case, a turboprop) of a type preferably provided for use in subsonic flight, and in driving engagement with a rotatable load, which is depicted as a propeller 12. The gas turbine engine 10 has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Engine 10 includes a casing through which a core gas path flows. While FIG. 1 depicts engine 10 as being a turboprop engine, other engine types are contemplated such as turboshaft engines. Engine 10 may also be a hybrid-electric engine or an auxiliary power unit.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the annular gaspath 20, which may also be a central axis of gas turbine engine 10. The gas turbine engine 10 is depicted as a reverse-flow engine in which the air flows in the annular gaspath 20 from a rear of the gas turbine engine 10 to a front of the gas turbine engine 10, relative to a direction of travel T of the gas turbine engine 10. This is opposite than a through-flow engine in which the air flows within the gaspath in a direction opposite the direction of travel T, from the front of the engine towards the rear of the gas turbine engine 10. The principles of the present disclosure can be applied to both reverse-flow and through-flow engines and to any other gas turbine engines, such as a turbofan engine and a turboprop engine.

In the case of an emergency shutdown due to a fire within the engine 10, the engine 10 is provided with procedures to improve the survivability of its hardware. Indeed, during a fire scenario, components such as oil tubes and fittings are exposed to an engulfing flame and are thus susceptible to damage, for instance leakage. In certain engines, for instance turbofan engines, if the aircraft is flying when the fire occurs, the fan may continue to rotate or windmill after the engine is shutdown. The rotating fan will continue to rotate the core engine rotors, which in turn will continue to drive the various engine accessories such as the oil pumps. The ongoing flow of oil throughout the engine components will act as a heat sink, spreading heat energy throughout the engine and limiting the risks of acute exposure. However, for other engine types such as turboprop engines and turboshaft engines, such windmilling may not be possible or be limited. As such, the present disclosure provides an auxiliary fluid system adapted to circulate oil throughout the oil system of the engine 10 in the case of a fire-induced emergency shutdown, thereby limiting the risks associated with the fire event.

Figure 2:
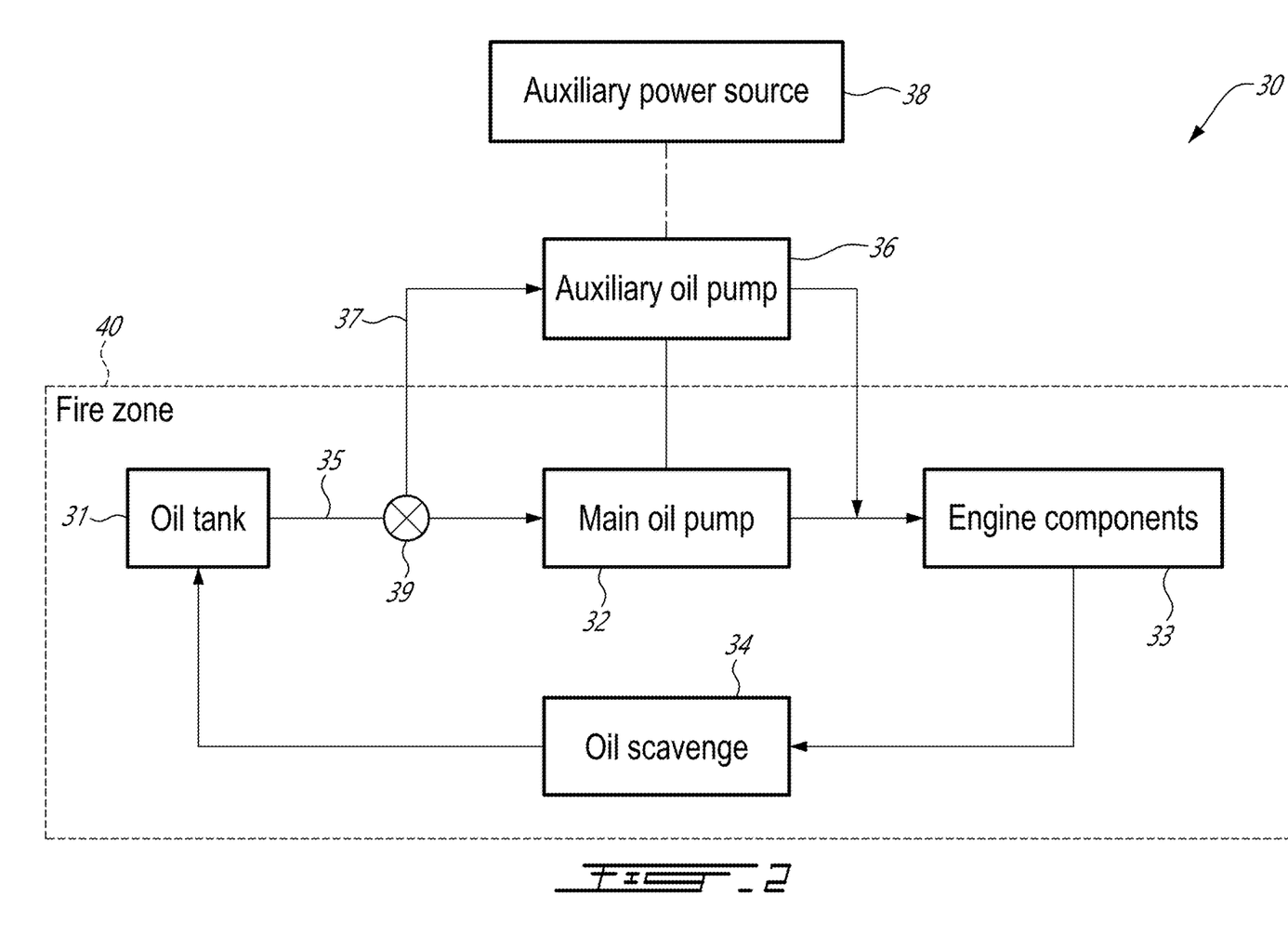
FIG. 2 is a schematic diagram of an exemplary oil system for the engine of FIG. 1.

Referring now to FIG. 2, an oil system 30 for the engine 10 is shown in accordance with an embodiment of the present disclosure. The oil system 30 includes components both inside and outside of a fire zone 40 of the engine 10. The fire zone 40 may be defined as the location(s) within and surrounding the engine 10 that are susceptible to be exposed directly to flames in the case of a fire within the engine 10. In some cases, the fire zone 40 is defined by the main casing of the engine 10. In other cases, only certain locations within the casing are within the fire zone 40. Other fire zone 40 delimitations are contemplated. The aircraft engine 10 and the oil system 30 may be collectively referred to as an aircraft engine system.

The oil system 30 includes, within the fire zone 40, an oil tank 31 (also referred to as an oil reservoir), a main oil pump 32, various engine component(s) 33 through which oil is circulated, and an oil scavenge 34 to collect oil from the engine components(s) 33 and return the oil to the oil tank 31. A main oil conduit 35, comprising a plurality of oil tubes, are provided for circulating the oil throughout the oil system 30. It is understood that other components of the oil system 30 within the fire zone 40 may be included, for instance one or more heat exchangers, filters and deaerators.

The oil system 30 further includes an auxiliary oil pump 36 fluidly coupled to the main oil conduit 35 via auxiliary oil conduit 37. The auxiliary oil pump 36 is powered independently of the main oil pump 32 and is disposed or located outside of the fire zone 40. Stated differently, the auxiliary oil pump 36 is positioned in a location where, in the case of a fire within the engine 10, it would not be exposed to direct flames or be susceptible to soak back. In an embodiment, the main oil pump 32 is directly driven by a rotor of the engine 10, for instance a high pressure rotor, the auxiliary oil pump 36 is powered by an auxiliary power source 38, for instance a battery disposed outside the fire zone 40. Other auxiliary power sources 38 are contemplated. For instance, in the case of a hybrid-electric engine, a battery powering an electric motor can also be used to power the auxiliary oil pump 36.

As such, in the case of a fire-induced emergency shutdown procedure, if the main oil pump 32 is unable to circulate oil throughout the oil system 30, for instance due to the high pressure rotor no longer rotating, the auxiliary oil pump 36 is engaged to circulate the oil throughout the oil system 30. The oil acts as a heat sink and minimizes the potential damage caused by the fire. The flow rate of oil circulated by the auxiliary oil pump 36 may be modest, as even a relatively low flow rate of oil compared to the flow rate of oil under typical operating conditions is sufficient to distribute heat efficiently. In the shown embodiment, but not necessarily the case in all embodiments, a valve 39 (or other like device) is provided at the junction of the main oil conduit 35 and the auxiliary oil conduit 37, upstream of the main oil pump 32, thereby allowing the flow of oil to bypass the main oil pump 32 when the auxiliary pump 38 is active. In some cases, the valve 39 is an active valve controlled, for instance via the auxiliary power source 38, to engage when the auxiliary oil pump 38 is activated. Other control configurations for the valve 39, for instance a passively-controlled valve, are contemplated.

Figure 3:
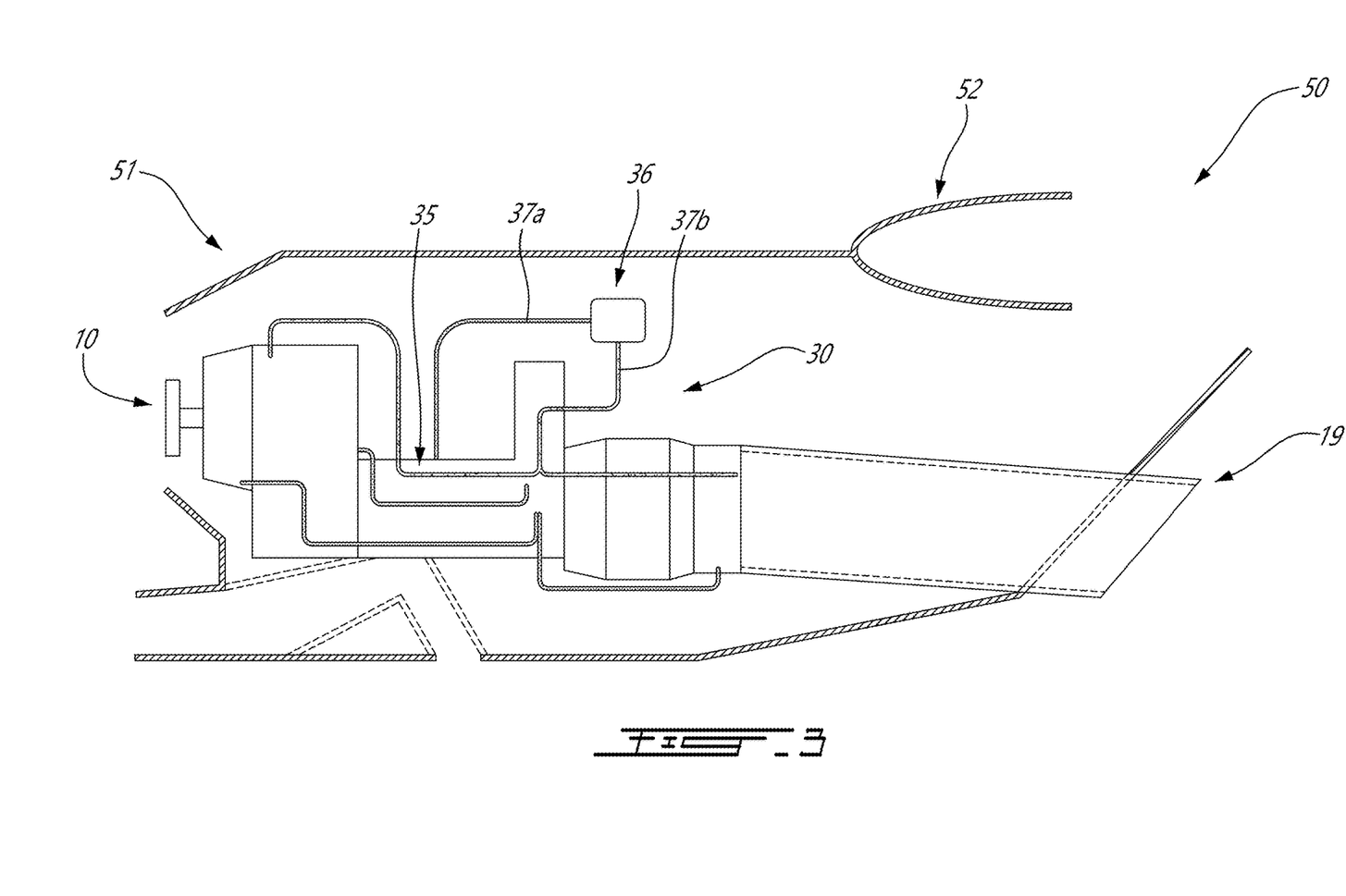
FIG. 3 is an enhanced cross-sectional view of the engine of FIG. 1 in an aircraft nacelle.

Referring now to FIG. 3, an exemplary depiction of an aircraft 50 with engine 10 and oil system 30. The engine 10, as well as the exhaust duct 19, are disposed within nacelle 51, upstream of a wing leading edge 52 of the aircraft 50. In this embodiment, the fire zone 40 (as shown in FIG. 2) includes the volume within the casing of the engine 10, as well as the areas underneath the engine 10 (i.e., between the underside of the casing and the lower portion of the nacelle 51). The auxiliary oil pump 36 is shown to be off-mounted located within the nacelle 51 but above the engine 10, i.e., outside of the fire zone 40, and fluidly connected to the main oil conduit 35 via auxiliary pump inlet 37a and auxiliary pump outlet 37b. In other embodiments, the auxiliary oil pump 36 is mounted on the engine 10 in an area outside the fire zone 40. Other locations for the auxiliary oil pump 36 are contemplated, for instance on a pylon.

Figure 4:
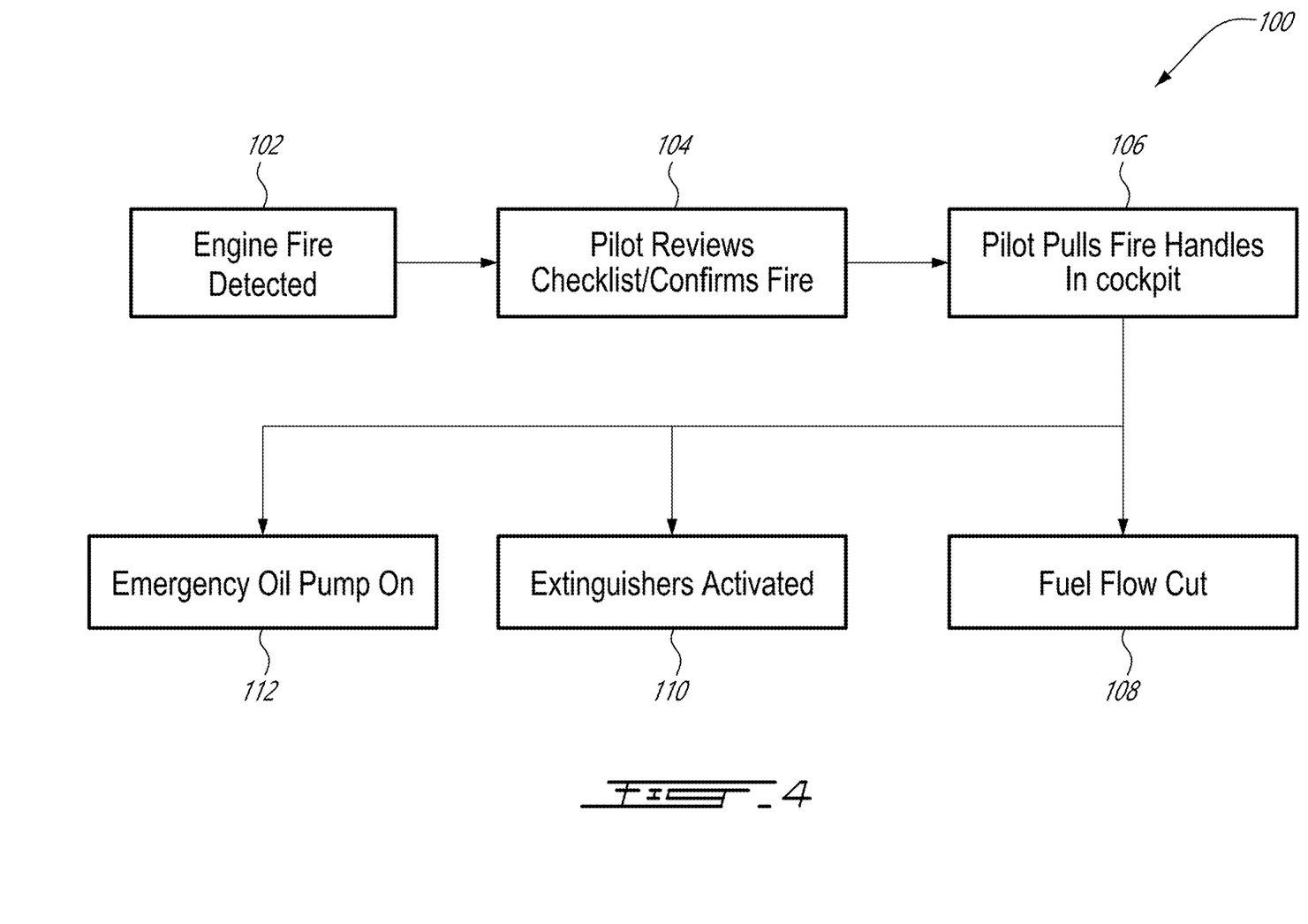
FIG. 4 is a flow chart of an exemplary shutdown procedure due to a fire within the engine of FIG. 1.

Referring to FIG. 4, there is shown at 100 an exemplary emergency shutdown procedure due to a fire within the engine 10, in accordance with an embodiment of the present disclosure. At 102, a pilot receives an indication that a fire within the engine 10 has been detected. At 104, the pilot reviews the appropriate checklist and confirms that a fire is indeed present within the engine 10. At 106, once the fire is confirmed, the pilot engages the emergency shutdown procedure, for instance by pulling a fire handle in the cockpit, which cuts fuel to the engine 10 (at 108) and activates one or more fire extinguishers (at 110). In addition, by way of the shutdown procedure, the auxiliary oil pump 36 is activated (at 112), for instance by receiving power from the auxiliary power source 38, and circulates oil throughout the engine's oil system 30 that would otherwise be stagnant. The auxiliary oil pump 36 may be set to automatically run for a predetermined amount of time once activated. Alternatively, the auxiliary oil pump 36, once activated, may continue running until manually deactivated by the pilot, for instance once the fire is confirmed to be extinguished. The circulating oil acts as a heat sink, thereby limiting the potential damage caused by the fire. In some cases, the auxiliary oil pump 36 is automatically activated once the emergency shutdown procedure is engaged (e.g., in response to the pilot pulling a fire handle in the cockpit). In other cases, the auxiliary oil pump 36 is manually activated by way of an additional activator. In some cases, control of the auxiliary oil pump 36 and auxiliary power source 38 is carried out by the aircraft bus.

Figure 5:
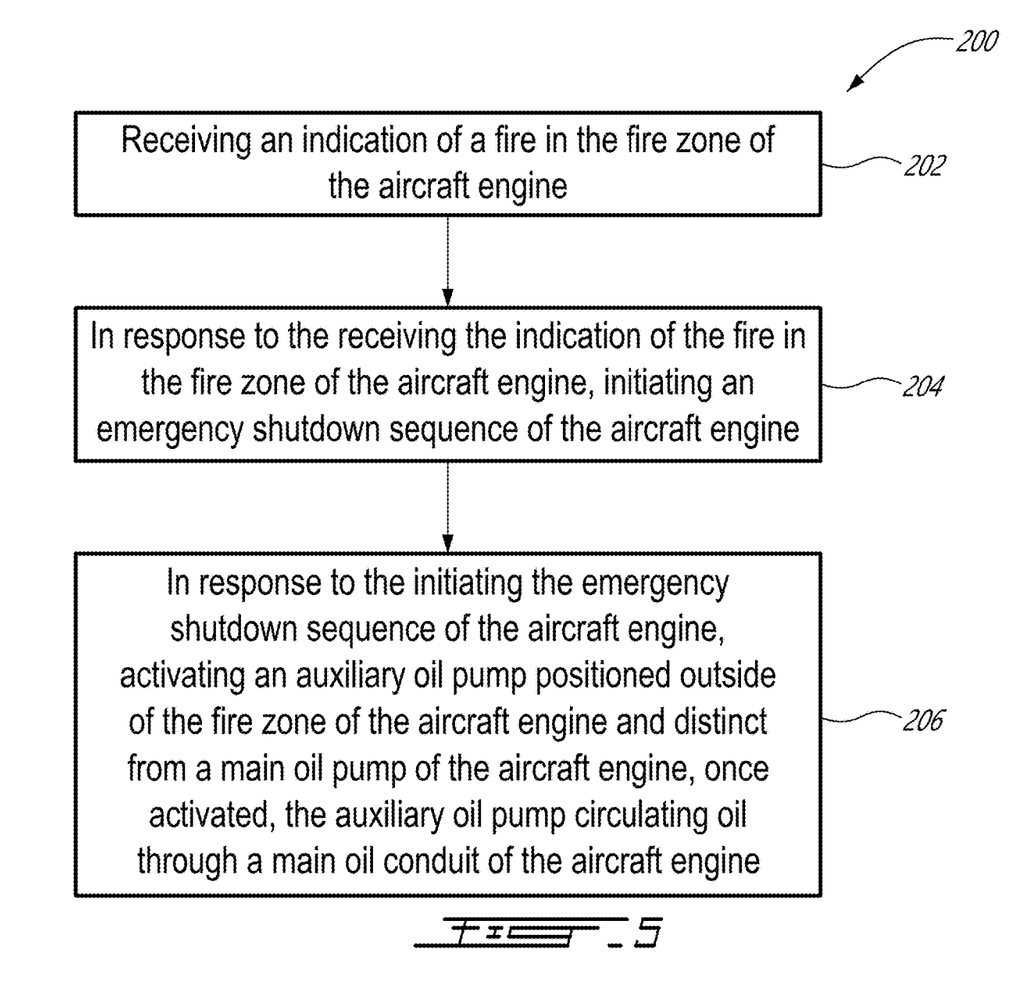
FIG. 5 is a flow chart of an exemplary method for operating an aircraft engine in a fire-induced emergency shutdown state.

Referring to FIG. 5, there is shown at 200 an exemplary method for operating an aircraft engine 10 in a fire-induced emergency shutdown state, according to an embodiment of the present disclosure. At 202, an indication is received of a fire in the fire zone 40 of the aircraft engine 10. At 204, in response to the receiving the indication of the fire in the fire zone 40 of the aircraft engine 10, an emergency shutdown sequence of the aircraft engine 10 is initiated. At 206, in response to the initiating the emergency shutdown sequence of the aircraft engine 10, an auxiliary oil pump 36 positioned outside of the fire zone 40 of the aircraft engine 10 and distinct from a main oil pump 32 is activated to circulate oil through the main oil conduit 35 of the aircraft engine 10.

In an embodiment, the step of activating the auxiliary oil pump 35 is automatically initiated upon the initiating the emergency shutdown sequence of the engine 10.

In an embodiment, the auxiliary oil pump 36 is powered by an auxiliary electrical power source 38 positioned outside of the fire zone 40 of the aircraft engine 10.

In an embodiment, the step of activating the auxiliary oil pump 36 further includes bypassing the main oil pump 32 by activating a bypass valve 39 at a junction of the main oil conduit 35 and an auxiliary oil conduit 37 fluidly coupling the auxiliary oil pump 36 to the main oil conduit 35 upstream of the main oil pump 32.

In an embodiment, the bypass valve 39 is powered by an auxiliary power source 38.

In an embodiment, the auxiliary oil pump 36 within a nacelle 51 surrounding the aircraft engine 10.

The present disclosure therefore provides for an auxiliary oil distribution system including an auxiliary oil pump that activates in case of a fire-induced emergency shutdown procedure to circulate oil through the engine's oil system, thereby acting as a heat sink and distributing heat from the fire throughout the engine. As such, potential damage and possible leakage of flammable fluids may be avoided. Advantageously, the engine incorporating this system may utilize lighter and thinner materials, as well as more compact designs, for its various components due to the distribution of heat under fire conditions.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the auxiliary pump is described herein as being positioned outside of the fire zone of the engine. It is understood, however, that in some embodiments the auxiliary pump can be physically positioned within the fire zone, yet provided with sufficient fire protection to be shielded from a nearby fire. Yet further modifications could be implemented by a person of ordinary skill in the art in view of the present disclosure, which modifications would be within the scope of the present technology.

The invention claimed is:

1. A method for operating an aircraft engine in a fire-induced emergency shutdown state, comprising:
   receiving an indication of a fire in a fire zone of the aircraft engine;
   in response to the receiving the indication of the fire in the fire zone of the aircraft engine, initiating an emergency shutdown sequence of the aircraft engine; and
   in response to the initiating the emergency shutdown sequence of the aircraft engine, activating an auxiliary oil pump positioned outside of the fire zone of the aircraft engine and distinct from a main oil pump of the aircraft engine, once activated, the auxiliary oil pump circulating oil through a main oil conduit of the aircraft engine, and bypassing the main oil pump by activating a bypass valve at a junction of the main oil conduit and an auxiliary oil conduit fluidly coupling the auxiliary oil pump to the oil main conduit upstream of the main oil pump.

2. The method as defined in claim 1, wherein the step of activating the auxiliary oil pump is automatically initiated upon the initiating the emergency shutdown sequence of the aircraft engine.

3. The method as defined in claim 1, further comprising powering the auxiliary oil pump with an auxiliary electrical power source positioned outside of the fire zone of the aircraft engine.

4. The method as defined in claim 1, further comprising powering the bypass valve via an auxiliary power source.

5. The method as defined in claim 1, further comprising positioning the auxiliary oil pump within a nacelle surrounding the aircraft engine.

6. An oil system for an aircraft engine, comprising:
   a source of oil;
   a main oil pump operable for circulating oil from the source of oil to a plurality of components of the aircraft engine via a main oil conduit;
   an auxiliary oil pump positioned outside of a fire zone of the aircraft engine, the auxiliary oil pump fluidly coupled to the main oil conduit to circulate oil through the main oil conduit to the components of the aircraft engine in the event of a fire-induced shutdown sequence of the aircraft engine, and
   a bypass valve at a junction between the oil conduit and an auxiliary oil conduit, the auxiliary oil conduit fluidly coupling the auxiliary oil pump to the oil conduit upstream of the main oil pump.

7. The oil system as defined in claim 6, further comprising an auxiliary power source configured to power the auxiliary oil pump in the event of the fire-induced shutdown sequence.

8. The oil system as defined in claim 7, wherein the auxiliary power source includes a battery positioned outside of the fire zone.

9. The oil system as defined in claim 6, wherein the bypass valve is electrically controlled by an auxiliary power source.

10. The oil system as defined in claim 6, wherein the auxiliary oil pump is positioned within a nacelle surrounding the aircraft engine.

11. The oil system as defined in claim 6, wherein the auxiliary oil pump is positioned against a casing of the aircraft engine, remote from the fire zone.

12. An aircraft engine system, comprising:
    an aircraft engine having a casing through which a core gas path flows, at least a portion of the core gas path defining a fire zone, and an oil system including a main oil pump and an oil conduit flowing oil throughout components of the aircraft engine;
    an auxiliary oil pump disposed outside of the fire zone and in fluid communication with the oil conduit, the auxiliary oil pump independently powered from the main oil pump, the auxiliary oil pump adapted to circulate the oil through the oil conduit to cool the components of the aircraft engine in the case of a fire-induced shutdown sequence of the aircraft engine; and
    a bypass valve at a junction between the oil conduit and an auxiliary oil conduit, the auxiliary oil conduit fluidly coupling the auxiliary oil pump to the oil conduit upstream of the main oil pump.

13. The aircraft engine system as defined in claim 12, further comprising an auxiliary power source configured to power the auxiliary oil pump in the event of the fire-induced shutdown sequence.

14. The aircraft engine system as defined in claim 13, wherein the auxiliary power source includes a battery positioned outside of the fire zone.

15. The aircraft engine system as defined in claim 12, wherein the bypass valve is electrically controlled by an auxiliary power source.

16. The aircraft engine system as defined in claim 12, wherein the auxiliary oil pump is positioned within a nacelle surrounding the aircraft engine.

17. The aircraft engine system as defined in claim 12, wherein the auxiliary oil pump is positioned against a casing of the aircraft engine, remote from the fire zone.

* * * * *